Aug. 12, 1924.
M. D. BELL
1,504,418
PISTON RING
Filed Nov. 9, 1922
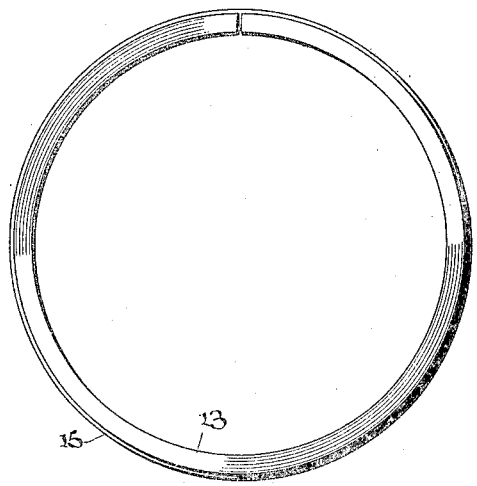
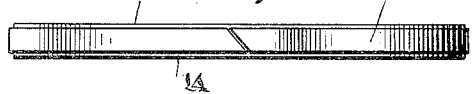
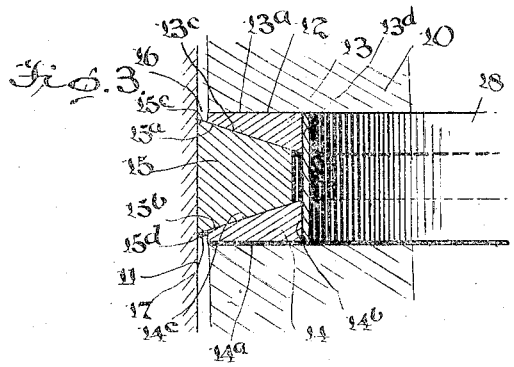
WITNESSES
R. E. Rousseau
INVENTOR
Marcus D. Bell,
BY
ATTORNEYS Patented Aug. 12, 1924.

1,504,418

UNITED STATES PATENT OFFICE.

MARCUS D. BELL, OF WEST TULSA, OKLAHOMA.

PISTON RING.

Application filed November 9, 1922. Serial No. 599,898.

*To all whom it may concern:*

Be it known that I, MARCUS D. BELL, a citizen of the United States, and a resident of West Tulsa, in the county of Tulsa and State of Oklahoma, have invented certain new and useful Improvements in Piston Rings, of which the following is a specification.

This invention relates in general to piston packing, and more particularly to an improvement of this character of the type embodying a plurality of piston rings.

The object of the invention is to provide a piston packing of this type wherein an oil seal is provided so as to insure an efficient packing action between the piston and the cylinder wall, the oil seal also preventing ingress of oil into the combustion chamber.

Another object is to provide a piston packing having these advantages and at the same time of such simple, though novel construction and organization, as to lend itself to convenient and inexpensive manufacture and assembly from material and with facilities ordinarily available.

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1 is a plan view, showing the piston ring assembly constructed in accordance with the present invention, the spring being omitted;

Figure 2 is a view in edge elevation of the construction shown in Figure 1; and

Figure 3 is a view in section, illustrating a piston equipped with the packing embodying the present invention.

Referring to the drawings wherein for the sake of illustration is shown the preferred embodiment of the invention, the numeral 10 designates a piston operating in a cylinder 11 in the usual manner. The piston is provided with any desired number of annular and circumferentially extending grooves 12 in which the piston packing is arranged. The piston packing preferably comprises three piston rings, designated at 13, 14 and 15, the rings 13 and 14 being known as the outer rings and the ring 15 being known as the inner ring since it is arranged in between the rings 13 and 14. The rings 13 and 14 are of identical construction though oppositely arranged in the annular groove 12. As shown in the drawings these rings 13 and 14 have flat plane faces, designated at $13^a$ and $14^a$ respectively, these faces being engageable with the side walls of the recess and being at right angles to the faces $13^b$ and $14^b$ which are arranged adjacent to and parallel with the base of the recess. The confronting faces of the rings 13 and 14 are inclined, as indicated at $13^c$ and $14^c$, respectively. It is to be noted that the rings 13 and 14 are of such diameter as to be entirely received within the grooves 12 though of course these rings are split in the usual manner. Also these rings 13 and 14 are of uniform cross sectional area throughout.

The inner ring 15 takes the form in cross section of a truncated pyramid and its side walls $15^a$ and $15^b$ have an inclination corresponding to the walls $13^c$ and $14^c$ of the rings 13 and 14, respectively, the wall $15^a$ of the ring 15 engaging the wall $13^c$ of the ring 13 and the wall $15^b$ of the ring 15 engaging the wall $14^c$ of the ring 14. The ring 15 is made of a slightly greater diameter than the rings 13 and 14 and in fact its diameter is such that this ring 15 is a snug working fit in the cylinder being for this purpose of the exact size of the cylinder. The longitudinal extent of the ring 15 in the cylinder is slightly less than the longitudinal extent of the groove 12 so that in the assembly the corners $15^c$ and $15^d$ of the ring 15 though slightly overhanging the adjacent portions of the rings 13 and 14 respectively do not extend entirely over these rings and thus define with the rings 13 and 14 oil receiving pockets 16 and 17, respectively, in which oil is collected to form a seal.

If desired a flat steel spring in the form of an annulus and of course split may be provided, the spring being designated at 18, and serving to force the rings into engagement with each other and the ring 15 into engagement with the wall of the cylinder.

I claim:

A piston packing comprising outer rings, an inner ring of greater diameter than the outer rings and arranged between the outer rings, the inner ring having a less longitudinal extent than the distance between the outermost faces of the outer rings whereby said inner rings and outer rings define oil receiving pockets providing oil seals, the contacting faces of the rings being inclined and a spring engageable with the outer rings and spaced from the inner ring for urging said rings into operative position and into packing relation with respect to each other.

MARCUS D. BELL.